Patented June 2, 1931

1,808,260

UNITED STATES PATENT OFFICE

MAXIMILIAN PAUL SCHMIDT AND WILHELM NEUGEBAUER, OF BIEBRICH-ON-THE-RHINE, GERMANY, ASSIGNORS, BY MESNE ASSIGNMENTS, TO GENERAL ANILINE WORKS, INC., OF NEW YORK, N. Y., A CORPORATION OF DELAWARE

NEW VIOLET VAT DYESTUFFS

No Drawing. Application filed February 23, 1926, Serial No. 90,206. Renewed October 10, 1927.

The present invention relates to new violet vat dyestuffs.

The violet vat-dyestuff obtainable according to the process described in Brit. Pat. 201,786 by condensing perylenetetracarboxylic acid with o-phenylenediamine has proved to be unsuitable for dyeing purposes owing to the fact that its leuco compound is very difficultly soluble. Furthermore, there is described in German Patent Nr. 412,122, Example 6, a dyestuff which is produced by condensing tetrachlor-perylene-tetracarboxylic acid with ortho-phenylenediamine. Although this dyestuff is readily soluble in the vat its fastness to soaping and boiling with sodium carbonate is very unsatisfactory.

Now we have found that dyestuffs of good solubility in the vat as well as great fastness to soaping and to boiling with sodium carbonate can be produced by using for the condensation process such halogenated perylenetetracarboxylic acids as contain only one to three, preferably two, halogen atoms.

In the description and claims by the term perylenetetracarboxylic acid we understand not only this acid itself, but also its anhydride.

The following example serves to illustrate our invention the parts being by weight.

46 parts of dichloro-perylenetetracarboxylic acid (obtainable by chlorinating perylene-tetracarboxylic acid in chlorosulfonic acid) are well ground together with 32 parts of ortho-phenylenediamine and the mass is then heated first for 3-4 hours to 130-150° C. and then for another 3-4 hours to about 260° C. The resulting coloring matter, after being dried and ground, may be used directly for dyeing purposes. It forms a brownish black powder which is soluble in concentrated sulfuric acid to a blue solution and is readily soluble in the vat. The dyestuff gives on cotton a violet dyeing of excellent fastness to soaping, boiling with sodium carbonate, and also to light and chlorine. It corresponds to one of the following isomeric formulæ:

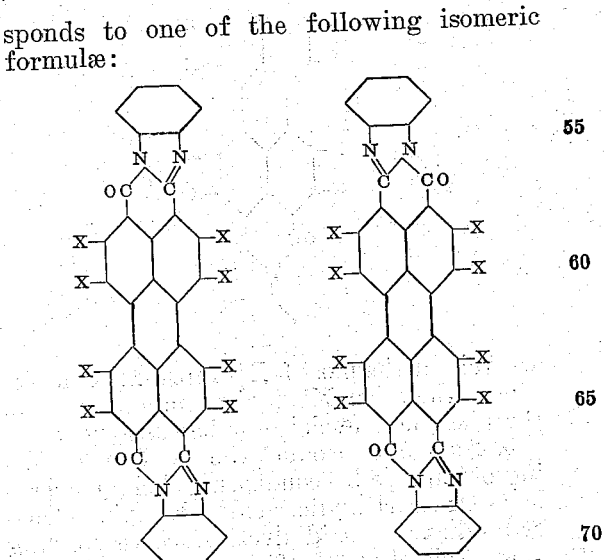

wherein 2 X's stand for halogen atoms, the other X's stand for hydrogen.

In the place of the ortho-phenylenediamine may be used substitution products, homologues or analogues thereof.

We claim:

1. As new products the vat dyestuffs being obtainable by condensing a perylene-tetracarboxylic acid, containing at the most three halogen atoms, with a phenylene-diamine and corresponding most probably to the general formula:

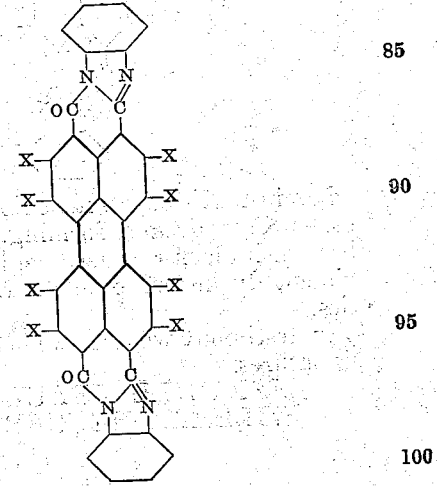

wherein at the most 3 X's represent halogen atoms, the other X's hydrogen, and wherein the phenylene nuclei may be substituted.

2. As new products the vat dyestuffs being obtainable by condensing a perylene-tetra-carboxylic acid, containing at the most three chlorine atoms, with a phenylene-ortho-diamine and corresponding most probably to the general formula:

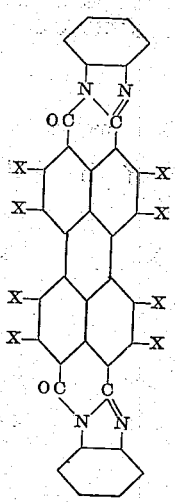

wherein at the most 3 X's represent chlorine atoms, the other X's hydrogen, and wherein the phenylene nuclei may be substituted.

3. As a new product the vat dyestuff being obtainable by condensing dichloro-perylene-tetra-carboxylic acid with phenylene-ortho-diamine, said dyestuff corresponding most probably to the following formula:

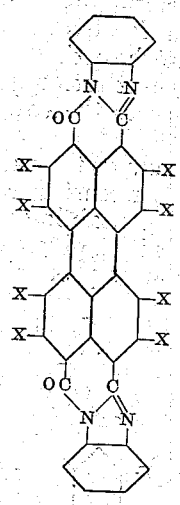

wherein 2 X's represent chlorine atoms, the other X's hydrogen, forming in a dry state a brownish-black powder, yielding on cotton a violent dyeing of excellent fastness properties.

In testimony whereof we hereunto affix our signatures.

MAXIMILIAN PAUL SCHMIDT.
WILHELM NEUGEBAUER.